United States Patent [19]

Danguillier et al.

[11] 3,983,756
[45] Oct. 5, 1976

[54] PROBE APPARATUS FOR A HIGH PRESSURE CHAMBER

[75] Inventors: Wilhelm Danguillier; Helmut Poloczek, both of Bochum, Germany

[73] Assignee: Dr. C. Otto & Comp. G.m.b.H., Bochum, Germany

[22] Filed: July 30, 1975

[21] Appl. No.: 600,382

[30] Foreign Application Priority Data
Oct. 9, 1974 Germany............................ 2438310

[52] U.S. Cl. ........................... 73/432 R; 73/343 R; 73/375; 73/420
[51] Int. Cl.² ......................................... G01L 11/30
[58] Field of Search............ 73/86, 343 R, 374, 420, 73/432 R, 432 A, 375; 137/317, 320, 323; 136/230, 231

[56] References Cited
UNITED STATES PATENTS

| | | |
|---|---|---|
| 2,234,056 | 3/1941 | Moore ................. 136/231 |
| 2,805,273 | 9/1957 | Cuthbert............................ 137/317 |
| 2,815,663 | 12/1957 | Lupfer ..................... 73/86 |
| 3,246,521 | 4/1966 | Humphrey ............. 73/343 |
| 3,831,452 | 8/1974 | Pittinger............... 73/422 R |

Primary Examiner—S. Clement Swisher
Attorney, Agent, or Firm—Brown, Murray, Flick & Peckham

[57] ABSTRACT

Disclosed is an apparatus including a probe adapted for removal through an aperture in the side wall of a high pressure chamber. The probe is supported at one end of a rod that is coaxially received within a sleeve. A plate at the free end of the rod forms a sealed connection between the rod and the sleeve. The sleeve extends within a tube attached at one end to the high pressure chamber in an enclosing relation with the aperture therein. The tube is divided along its length and secured by flanges to a valve used to selectively block the flow of media from the high pressure chamber after the sleeve is withdrawn along the tube beyond the valve. Screw threads on the external surface of the sleeve mate with internal screw threads formed in a screw head that is supported by the end of the tube to displace the sleeve therealong. A passageway in the screw head communicates with a bore therein for discharging pressurized gas into the interior of the tube and thereby prevents the flow of medium from the high pressure chamber during axial movement of the sleeve until the valve is closed.

6 Claims, 3 Drawing Figures

PROBE APPARATUS FOR A HIGH PRESSURE CHAMBER

BACKGROUND OF THE INVENTION

This invention relates to a probe for use in a high pressure chamber and more particularly to a construction and arrangement of parts which includes a rod to support the probe within the high pressure chamber and remove the probe through an aperture in the side wall of such a chamber for servicing and/or replacement.

In gas producers, reactors and other similar apparatus, elevated pressures and frequently also extremely high temperatures are used to insure that the required reactions take place more effectively or to enable the use of a chamber with the smallest possible physical dimensions. The wall thickness required to maintain the high pressure in the interior of such chambers naturally renders access to the individual portions of the high pressure chamber difficult. Moreover, certain types of reactions in such chambers can be carried out only if certain reaction variables are continuously monitored, for example, the temperature or the material composition. Continuous monitoring may also include the control of reaction variables necessary to the reaction process.

Measuring apparatus used within a high pressure chamber for the purpose of monitoring or determining reaction variables or other devices for determining or influencing the reaction are usually subject to considerable wear, particularly because of extremely high pressure and temperature conditions within a chamber. The wear of such measuring apparatus or other devices causes their destruction or at least a loss of utility for their intended use. It is, therefore, desirable to enable the removal of the unusable measuring apparatus or other devices without any appreciable disturbance to a reaction taking place in the chamber. In other words, the replacement operation should be carried out in a manner such that the pressure and/or temperature is maintained at desired values in the interior of the high pressure chamber.

SUMMARY OF THE INVENTION

It is an object of the present invention to provide apparatus to install a measuring device or a similar type of device as hereinbefore described for determining and/or controlling parameters of a reaction in a reaction chamber under an elevated pressure and/or temperature in a manner such that a probe for the device is disposed at the end of a solid or hollow rod which can be removed and replaced in a reaction chamber during the reaction operation while maintaining a desired pressure and/or temperature in the chamber.

It is a further object of the present invention to provide an apparatus for the removal and/or replacement of a probe through an aperture in the side wall of a reaction chamber wherein the probe is defined for the purpose of disclosing the present invention to include a thermocouple with electrical leads carried by a rod, a sampling device to draw off part of a gas mixture from within a reaction chamber at the place of measurement, means for supplying substances for controlling the reaction within a high pressure chamber or means for supplying heat or cooling agents into a reaction chamber. Such forms of a probe are carried by a rod having a desired stiffness and, depending upon the type of probe, the rod may be solid, hollow or constructed in other suitable forms.

More specifically, according to the present invention there is provided an apparatus for use in combination with a high pressure chamber having an aperture in the side wall thereof, the apparatus comprising probe means adapted for operation within the high pressure chamber, the probe means being removable from the chamber through an aperture in the side wall thereof, a rod for supporting the probe within the high pressure chamber, an elongated sleeve having an axially-extending opening for receiving at least a portion of the rod, the elongated sleeve having external screw threads, means connected to the rod and the elongated sleeve to form a gas pressure-tight closure therebetween, a tube extending from the side wall of the high pressure chamber in a manner to form an external extension to the aperture therein, the tube being adapted to internally receive at least a portion of the length of the elongated sleeve in a generally coaxial extending relation, a valve including means arranged within the tube to selectively block the flow of a media therein from the high pressure chamber after positioning of the elongated sleeve and the probe means along the tube beyond the valve relative to the high pressure chamber, a screw head supported by the tube at the end thereof which is extended from the high pressure chamber, the screw head having a bore including internal screw threads for mating engagement with the external screw threads on the elongated sleeve, and means for conducting pressurized gas into the interior of the tube between the valve and the screw head.

Thus, the apparatus of the present invention includes a probe support rod extending inside a sleeve having external screw threads which, in turn, pass through a tube that is connected to, for example, the external metal lining of a high pressure chamber. The tube is adapted to be shut off by a valve cock which includes a valve plug located within the tube in a manner such that when the valve plug is in an open position, the sleeve is displaced through the tube and an opening in the plug. Supported at the outer terminal end of the tube is a screw head having an inlet or passageway for gas under a pressure higher than the pressure in the chamber. The type of gas which is used should not appreciably affect the process taking place in the high pressure chamber. The screw head includes a bore having internal threads for mating engagement in a pressure-tight relationship with the external threads on the sleeve. The rod and the sleeve are provided with a pressuretight closure at a location outwardly beyond the screw head and which closure is designed for a releasable interconnection.

These features and advantages of the present invention as well as others will be more fully understood when the following description is read in light of the accompanying drawings, in which.

Figure 1:
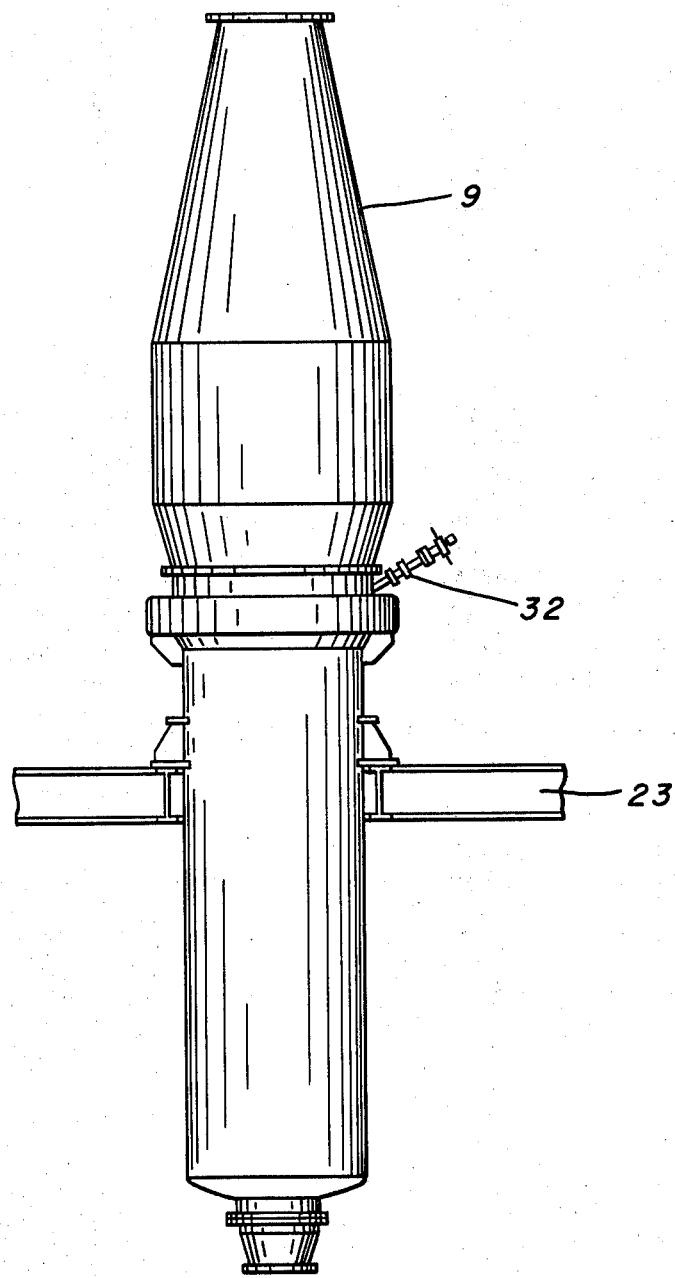
FIG. 1 is an elevational view of a high pressure tank or container for use with the probe apparatus according to the present invention.

FIG. 1 illustrates a container 9 forming a high pressure chamber which may, for example, take the form of a slag bath generator. Support structure 23 is used to carry the container at the lower portion along its height. FIG. 1 also illustrates a probe apparatus 32 embodying the features of the present invention. The probe apparatus extends in an outwardly-projecting direction from the side wall of the container.

Figure 2:
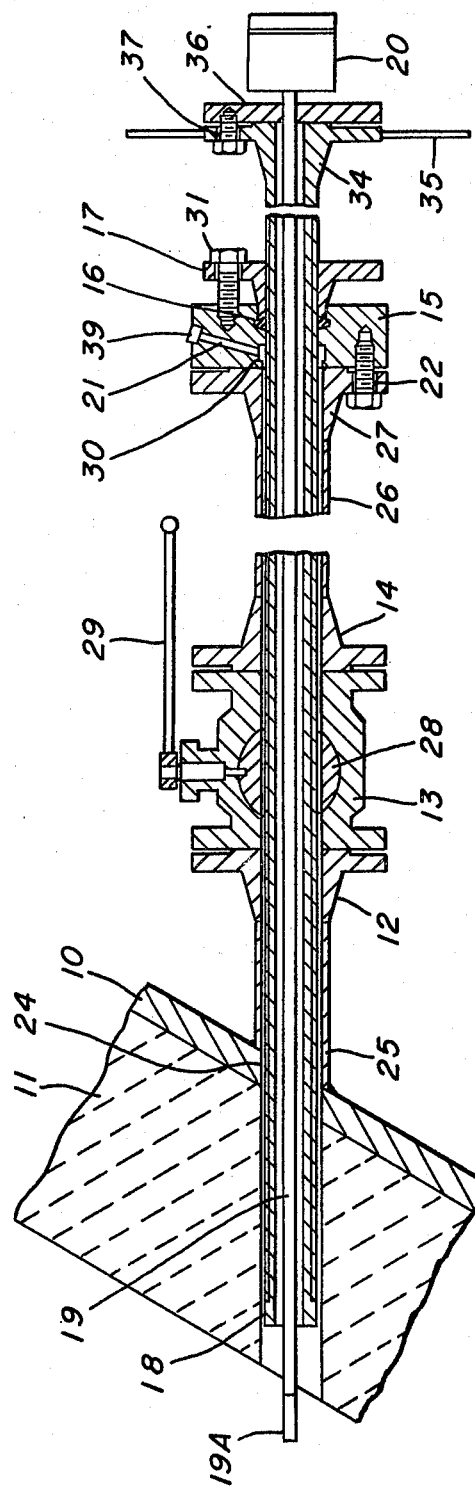
FIG. 2 is a longitudinal section through the probe apparatus of the present invention.
Figure 3:
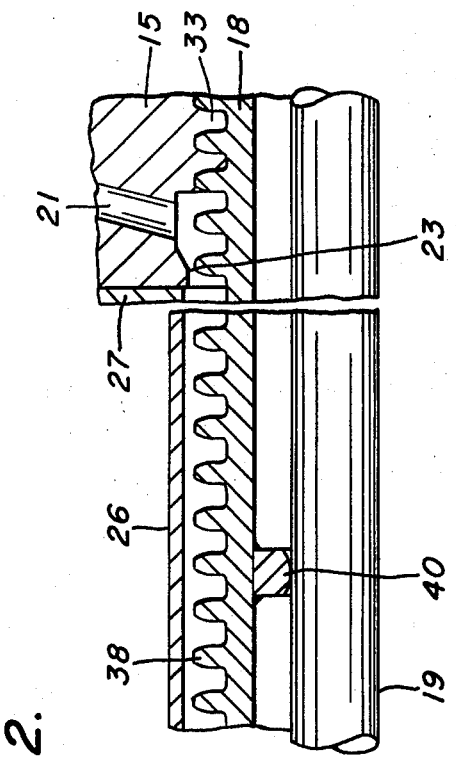
FIG. 3 is an enlarged view of a portion of the apparatus shown in FIG. 2.

The probe apparatus of the present invention is clearly shown in FIGS. 2 and 3 wherein the refractory wall 11 of the container is of the type which includes an outer metal lining 10. A rod 19 carries a probe 19A at one end thereof. A sleeve 18 surrounds the rod 19 in a generally coaxial relation by passing through a bore 24 in the sleeve. The sleeve is guided by a guide tube made up of tube portions 25 and 26 that extend outwardly beyond the metal lining 10 of the container. One end of the guide tube portion 25 is secured to the metal lining of the container and forms an external extension to the bore 24 in the side wall. The free end of tube portion 25 is secured to a flange 12. A flange 14 is secured to one end of the guide tube portion 26 and secured between the flanges 14 and 12 is a valve cock 13 which includes a plug 28 that is adjustably controlled externally of the valve by a lever 29.

The guide tube portion 26 terminates in a flange 27 which is secured to a screw head 15 by bolts 22. The screw head 15 has an internal bore 30 which communicates with a generally radial extending opening or passageway 21 adapted for conducting pressurized gas. More specifically, the bore 30 in the screw head is formed with nozzles 23 that communicate with the interior of the guide tube portion 26 at one end of the opening 21; while at the other end thereof, the screw head has threads to receive a fitting 39 of a gas supply line, not shown. The fitting 39 can be replaced by a thread plug.

FIG. 3 clearly illustrates the external screw threads 38 that are formed along the sleeve 18. Also clearly illustrated are screw threads 33 formed internally in the screw head 15. The screw threads 33 terminate short of the nozzle 23 that communicates with the passageway 21. At the rear of the screw head 15 which is most remote from the refractory wall 11, a gland ring 16 is adjustably pressed by screws 31 into contact with a gland member 17. The sleeve 18 projects outwardly from the screw head 15 and the gland member 17 where it terminates in a flange 34 provided with an operating handle 35. A closure cover 36 receives screws 37 that are used to tightly secure the closure cover 36 onto the flange 34. In this way, the closure cover 36 is used to close off the interior of the sleeve 18 to the passage of gases and/or other media from both the high pressure chamber of the container 9 and the gas discharged by passageway 21. Rod 19 passes through closure cover 36 in a sealed or pressure-tight relationship therewith. Secured to the projected end of rod 19 is a connecting head 20 which, depending upon the type of probe 19A that is employed, the connecting head may further contain other elements of the probe or connection to the probe as may be required by the particular construction of the probe. Rings 40 are used to secure or hold the rod 19 in a central position relative to the inner wall of the sleeve 18. In this way, the rod extends in a substantially coaxial relation with the sleeve which, in turn, extends in a substantially coaxial relation with the guide tube portions 25 and 26.

When it is required to remove the probe from the high pressure chamber, the sleeve 18 with the rod rigidly attached thereto and extending in a generally coaxial internal relation therewith are rotated to withdraw them from the screw head 15 while at the same time gas under pressure is introduced into the interior of the screw head through passageway 21. After the probe and the inner end of the sleeve have passed outwardly from the chamber beyond the plug 28 of the valve, the handle 29 is used to close the valve. The supply of gas pressure to the interior of the screw head is then terminated. The interior of the sleeve 18 can now be exposed to the atmosphere outside the high pressure chamber. The connection between the sleeve and the rod can be released by the removal of bolts 37. The rod, together with the probe can be removed from the sleeve.

To introduce a new probe, the probe is attached to rod 19 and then placed within the sleeve 18 whereupon the sleeve and the rod are rigidly connected together by closure cover 36 using bolts 37 so that the interior of the sleeve is shut off in a pressure-tight manner. The interior of the screw head 15 is then again subjected to gas pressure using passageway 21. The sleeve is then rotated to again establish the mating engagement between the external screw threads on the sleeve and the internal threads in the screw head. After the sleeve has been advanced along the guide tube portion 26 to a position just adjacent the plug 28 of the valve, the plug is placed in the open position so that the probe and the front end of the sleeve will continue gradual movement through the valve and then into the guide tube portion 25. Continued rotation of the sleeve advances its leading end through guide tube portion 25 and thence through the aperture in the side wall of the high pressure chamber until the final desired position of the probe in the reaction chamber is reached. The supply of gas under pressure through passageway 21 is then terminated and sealed off by installing a closure plug.

Although the invention has been shown in connection with a certain specific embodiment, it will be readily apparent to those skilled in the art that various changes in form and arrangement of parts may be made to suit requirements without departing from the spirit and scope of the invention.

We claim as our invention:

1. An apparatus for use in combination with a high pressure chamber having an aperture in the side wall thereof, said apparatus comprising:

probe means adapted for operation within said high pressure chamber, said probe means being removable from said chamber through the aperture in the side wall thereof, a rod for supporting said probe means within said high pressure chamber, an elongated sleeve having an axially-extending opening adapted to receive at least a portion of said rod, said elongated sleeve having external screw threads, means connected to said rod and said elongated sleeve to form a gas pressure-tight closure therebetween, a tube extending from the side wall of said high pressure chamber in a manner to form an external extension to said aperture, said tube being adapted to internally receive at least a portion of the length of said elongated sleeve in a generally coaxial extending relation, a valve including means arranged within said tube to selectively block the flow of a media therein from said high pressure chamber after positioning of said elongated sleeve and said probe means along said tube and generally beyond said valve relative to said high pressure chamber, a screw head supported by said tube at the end thereof extending from said high pressure chamber, said screw head having a bore including internal screw threads for mating engagement with the external screw threads of said elongated sleeve, and means for conducting pressurized gas into the interior of said tube between said valve and said screw head.

2. The apparatus according to claim 1 wherein said means connected to said rod and said elongated sleeve include a closure plate secured to said rod and detachably secured to said elongated sleeve.

3. The apparatus according to claim 2 further comprising a flange secured to the outwardly-extended end of said elongated sleeve which projects from said screw head.

4. The apparatus according to claim 1 wherein said means for conducting pressurized gas includes a passageway in said screw head to communicate with the bore therein.

5. The apparatus according to claim 1 further comprising ring means for positioning said rod relative to the inner wall of said elongated sleeve.

6. The apparatus according to claim 1 wherein said tube is divided between the terminal ends thereof and wherein said valve includes mounting flanges at opposite sides thereof, said apparatus further comprising a flange secured to the divided ends of said tube for attachment to said mounting flanges of the valve.

* * * * *